106-75

Plastic beads

United States Patent Office 3,434,980
Patented Mar. 25, 1969

3,434,980
PRODUCTION OF INSULATING MATERIALS HAVING LOW SPECIFIC GRAVITY
Fritz Stastny, Ludwigshafen (Rhine), Rudolf Gaeth, Limburgerhof, Pfalz, Bernhard Schmitt, Heidelberg, and Udo Haardt, Ludwigshafen (Rhine), Germany, assignors to Badische Anilin- & Soda-Fabrik Aktiengesellschaft, Ludwigshafen (Rhine), Germany
No Drawing. Filed May 20, 1965, Ser. No. 457,508
Claims priority, application Germany, June 3, 1964, B 77,052; Mar. 5, 1965, B 80,831; Apr. 17, 1965; B 81,511
Int. Cl. C04b 43/00, 25/04
U.S. Cl. 260—2.5
8 Claims

ABSTRACT OF THE DISCLOSURE

Heat-insulating materials are prepared by introducing porous plastic particles into inorganic binders which are suspensions of water-containing alkali metal silicate particles and inorganic fillers in aqueous solutions of alkali metal silicates and solidifying the mixture.

This invention relates to a process for the production of insulating materials having low specific gravity.

A process for the production of building elements having low specific gravity is described in German patent specification No. 964,217, the said process comprising mixing finely particled porous thermoplastics having close pores and having little or no water absorptivity with water-containing binders, shaping the mixture and allowing it to set. The process is carried out as a rule by charging the plastic and the binder into a mold and allowing the mixture to set, optionally while supplying heat. The binders used may be in particular the binders conventionally used in the building industry, such as cement, gypsum or mortar. It is also possible to use, instead of these inorganic binders, organic binders, for example aqueous solutions of adhesive or curable synthetic resins, for example urea-formaldehyde condensation products. These building elements may be used for example for the production of partitions, floors, floor underlays, sound-insulating wallboards and the like. When the said inorganic binders are used as the binders, the building elements have a certain heat resistance and thermal insulating action. They are however not able to withstand permanent thermal stress at high temperatures, for example of more than 900° C., because at these temperatures the mechanical cohesion is substantially destroyed, for example by crumbling in the case of concrete. The said binders have the further disadvantage that they set only slowly and that consequently the production of the building elements in question requires a considerable time. Finally it should also be mentioned that these building elements, if their mechanical cohesion is to be ensured, must have a relatively high specific gravity which usually should not be less than 600 kg./cu. m.

It is an object of the present invention to provide a process for the production of thermal insulating materials from porous plastic and inorganic binders, said thermal insulating materials having a low specific gravity and an outstanding stability to permanent thermal stress.

This object can be achieved when suspensions of water-containing alkali metal silicate particles and inorganic fillers in aqueous solutions of alkali metal silicates are used as binders and the mixture is consolidated at temperatures above 20° C. and below the sintering temperature of the plastics particles, with or without extraction of water, the plastics particles used being those which do not undergo any change in volume under the action of the temperatures chosen.

The solid alkali metal silicate powder used is advantageously commercial powder which as a rule has a water content of 16 to 20% by weight. This content is however not critical since powder having a higher water content and also powder having a lower water content may be used. The concentration of the alkali metal silicate solution may be varied within wide limits. For example, solutions having a concentration of 15° to 60° Bé. may be used. It is advantageous however to use commercial solutions, for example those having a concentration of about 38° Bé. in the case of sodium waterglass solution. The ratio of $Na_2O$ to $SiO_2$ in the solid or liquid alkali metal silicates may also be varied within wide limits and may amount for example to from 1:2.0 to 1:4.0, and in this case also it is advantageous to start from commercial alkali metal silicates in which the said ratio is about 1:3.3. The resistance to water of the insulating materials prepared according to this invention is decisively influenced by the said ratio. The higher the content of $SiO_2$ in the alkali metal silicate chosen, the higher is the resistance to water of the insulating material prepared. Silicic acid, for example in the form of silica gel, may therefore be added to the said solutions. Waterglass powder and waterglass solution are used in such amounts that the total water content of the suspensions is from about 25 to 75% by weight with reference to the alkali metal silicate contained therein. These mixtures, according to the water content, have the property of consolidating even at room temperature.

Inorganic fillers include substances which either do not enter into any reaction with the alkali metal silicates or which react only slowly at room temperature or which do not react until elevated temperature is reached. Examples of such fillers are magnesium oxide, talc, calcium carbonate, asbestos powder, glass powder, quartz powder, zinc carbonate or, as already mentioned above, silica gel. Zinc oxide and sodium silicofluoride are particularly suitable fillers. It is also advantageous to use fillers which have a low bulk density. Silicic acid powder which has a low bulk density and a large pore radius is particularly suitable for this purpose. Such powders may be prepared for example according to German patent specification No. 1,073,459 by first adding ammonia to an alkali metal silicate solution and precipitating the silicic acid from this solution by adding acids. In addition to their favorable low bulk density, such powders have the further advantage that unlike silicic acid gels they do not have the property of exerting a thickening influence on the alkali metal silicate solutions even at room temperature, and this considerably facilitates the production of a homogeneous mixture. Obviously these powders may also be used together with silicic acid gels or also other inorganic fillers. The fillers are advantageously used in such amounts that the ratio of anhydrous alkali metal silicate to filler is from about 1:1 to 4:1.

The porous plastics particles used may be for example those of polystyrene or styrene copolymers, for example from styrene and acrylonitrile, acrylic acid, butadiene and the like. These expanded plastics particles are prepared in conventional manner by heating the particles formed, which contain low boiling point liquids or gases as blowing agents, so that the particles are expanded. Porous plastics particles based on vinyl chloride or copolymers of vinyl chloride and vinylidene chloride are also suitable. It is advantageous to add flame-retardant compounds, for example inorganic halogen compounds or mixtures of chloroparaffin powder and antimony trioxide to the said porous plastics particles. The plastics particles are used in such amounts that the ratio of the content of anhydrous alkali metal silicates and the inorganic fillers to the volumetric content of plastics particles is from 4:1 to 1:10, particularly from 1:1 to 1:5.

Since, as already explained, the alkali metal silicate suspensions solidify even at room temperature, the production of the insulating materials according to this invention is advantageously carried out by first mixing together the solid substances, i.e., the alkali metal silicate particles, fillers and expanded plastics particles, and introducing the predetermined amount of alkali metal silicate solution, for example by spraying. Water may then be abstracted from the mixture obtained at the said temperatures. The abstraction of water may however also be effected by storing the solidified article in vacuo, for example at 30 to 300 mm. Hg, at room temperature, for example 20° to 25° C. To accelerate solidification at low temperatures, the mixtures may be stored in carbon dioxide or in an atmosphere whose content of carbon dioxide is larger than that of air. For this purpose, the mixtures are introduced into a closed chamber into which for example air enriched with carbon dioxide is introduced at one side while the gas is withdrawn at the opposite side. It is also possible to solidify the mixtures under superatmospheric pressure, for example at 0.5 atmosphere gauge. The mixtures may either be introduced into metal molds which are heated on all sides, or applied to an endless band and heated to the desired temperature by heating the band or exposing the upper side, for example by blowing on hot air or superheated steam or by infrared radiation or transfer of contact heat. Heating is discontinued when the water content of the mixture has fallen below 20% by weight. It is advantageous for the water content of the solid article to be about 5 to 15% by weight. To prevent the possible occurrence of cracks during the drying of the mixture, it is advantageous to add to the mixtures organic substances, such as carbohydrates, cellulose ethers, polyglycols and the like.

To obtain insulating materials having an extremely low unit weight, for example having unit weights of about 80 to 150 kg./cu. m., the initial materials are mixtures which contain a high proportion of porous plastics. To obtain insulating materials having good mechanical properties, the mixtures are compressed to 10 to 75% of their original bulk volume prior to consolidation and consolidation is carried out in the compressed condition. Compression of the mixtures prior to their solidification may for example be carried out in a mold having perforations on all sides. The degree of compression depends on the desired unit weight of the insulating material to be prepared. The mixture is left in the mold in the compressed state at least long enough for it to solidify, and if desired a portion of the water may be removed while the mixture is in the compressed condition. The remainder of the water may then be removed without compression, at elevated temperatures at atmospheric pressure, but also in vacuo, for example at a pressure of 30 to 300 mm. Hg. The temperature at which withdrawal of water takes place should not be higher than the softening point of the plastic contained in the insulating material.

The mechanical properties of these insulating materials may be further improved by adding plastics dispersions to the mixtures prior to solidification. Examples of dispersions which are suitable for this purpose are a 50% aqueous dispersion of a copolymer of 55% of vinyl chloride and 45% of butyl acrylate, and about 50% aqueous dispersion of 2-chlorobutadiene. Insulating materials having a very smooth surface and sharp edges and which are resistant to compression and show only very slight abrasion under mechanical stress are obtained by the said additions.

Insulating materials prepared in accordance with this invention are distinguished by a very uniform porous consistency. Their unit weight, depending on the content of plastics and the specific gravity of the inorganic fillers, is about 200 to 300 kg./cu. m. They have excellent insulating properties and retain them even when exposed to permanent thermal stress, for example in case of fire. When they have a high ratio of $SiO_2$ to alkali metal oxide, they are also extremely resistant to the action of moisture. Increased resistance to the action of water may also be achieved by aftertreatment of the foam article with acids, for example phosphoric acid or hydrochloric acid, or with solutions of heavy metal salts, for example zinc chloride.

Insulating materials according to this invention, for example in the form of boards which may be coated for example with metal sheets, plaster boards, asbestos cement boards or sheets of plastics, plywood or chipboard, may be used as building elements as insulating and fire protecting layers. They may also be used for coating walls, ceilings, lofts and floors and as insulating partition in warehouses and cold storage installations.

The invention is further illustrated by the following examples.

EXAMPLE 1

800 parts by weight of expanded polystyrene particles having a diameter of about 0.3 to 2 mm., which contains 6% by weight of hexabromocyclododecane and has a powder density of 15 g./l., is mixed with 1,500 parts by weight of sodium waterglass powder having a water content of 16% by weight and a particle size of 0.1 to 0.5 mm., 500 parts by weight of zinc oxide, 100 parts by weight of powdered magnesium oxide and 100 parts by weight of quartz powder. 500 parts by weight of a 15% caustic potash solution and 12,000 parts by weight of sodium waterglass solution having a concentration of 39° Bé. is sprayed onto this mixture while stirring. The ratio of $Na_2O$ to $SiO_2$ in the sodium silicate powder and in the solution is 1:3.3. The friable composition thus formed is charged into an aluminum container having the dimensions 1 x 1 x 0.30 m. whose inner wall is lined with perlon cloth. The container is filled to a depth of 28 cm. It is closed with a loosely applied aluminum cover and stored for forty minutes in a steam autoclave at a steam pressure of 0.5 atmosphere gauge. The container is cooled and an insulating block is removed therefrom having the dimensions 1 x 1 x 0.28 m. The block is dried and then has a unit weight of 215 kg./cu. m.

The block is cut by means of a band saw into boards having a thickness of 3 cm. These boards are suitable for example as insulating partitions in composite elements. The boards offer high resistance to the passage of heat which is maintained even upon prolonged action of heat because the inorganic skeleton is not destroyed.

EXAMPLE 2

1,500 parts by weight of waterglass powder having a water content of 20% by weight and a particle size of 0.2 to 0.4 mm. is mixed with 200 parts by weight of silica gel having a bulk density of about 600 g./l., 200 parts by weight of zinc oxide. 80 parts by weight of silicic acid powder having a bulk density of 125 g./l. and 300 parts by weight of expanded styrene particles having a bulk density of 10 g./l. and an average particle size of 1.1 mm. 2,000 parts by weight of water is added to this mixture and then 1,500 parts by weight of a sodium waterglass solution having a concentration of 39° Bé.

The mixture is charged into a container as described in Example 1 and dried therein for two hours at a temperature of 65° C. and then for seven days at 30° C.

The homogeneous porous block formed is sawed as described in Example 1 into boards which are outstandingly suitable as insulating and fireproofing boards.

If such boards having a thickness of 4 mm. are combined on both sides with asbestos cement boards having a thickness of 6 mm. each, composite elements are obtained with which a temperature which is 140° C. higher than room temperature is reached on the side turned away from the flame in a flame test according to DIN 4102 after more than one hundred minutes. Such elements may therefore be classified in fire resistance class F–90 in accordance with DIN 4102.

EXAMPLE 3

640 parts of expanded polystyrene particles having a diameter of 1 to 3 mm. and a bulk density of 20 g./l., 70 parts by weight of silica gel powder having a bulk density of about 60 g./l., 700 parts by weight of talc, 600 parts by weight of zinc oxide, 500 parts by weight of quartz powder, 50 parts by weight of ultramarine blue, 750 parts by weight of waterglass powder having a water content of 18% by weight and a particle size of 0.2 to 0.4 mm., are introduced into an intense mixer. 1,750 parts by weight of a sodium waterglass solution having a concentration of 39° Bé., 100 parts by weight of 30% caustic potash solution and 200 parts by weight of an aqueous solution containing 50 parts by weight of cane sugar are also added to the mixture. The alkali metal silicates have a ratio of $Na_2O$ to $SiO_2$ of 1:3.3. The substances are mixed for three minutes and a loose, easily pourable mixture is formed. This mixture is introduced into a rectangular mold consisting of wooden sides which rest on a piece of sailcloth lying on a support. The mold is open at the top. The mixture is uniformly distributed in this mold and then presssed to such an extent that the height is lowered by about 20%. The wooden sides are then removed so that a shaped article corresponding to the dimensions of the wooden mold remains which is still loose. This is stored for twenty-four hours each at 22° C., 70° C. and 90° C. at a pressure of 70 mm. Hg. A coherent block of expanded material which is resistant to pressure is obtained; its unit weight is 210 kg./cu. m. This block is cut by means of a vertical band saw into boards having a thickness of 5 cm.

The boards are suitable as insulating materials. Under the action of a fire in which temperatures of about 1000° C. may occur, the boards exhibit a good insulating action because the inorganic constituents contained therein form a porous body.

The boards may for example be coated with mortar. They may also be combined with other plates or boards, for example sheets of metal or boards of asbestos cement.

EXAMPLE 4

1,500 parts by weight of a sodium waterglass solution having a concentration of 39° Bé., 1,000 parts by weight of waterglass powder having a water content of 16% by weight and a particle size of 0.2 to 0.5 mm., 70 parts by weight of silica gel having a bulk density of about 600 g./l., 1,000 parts by weight of talc, 750 parts by weight of zinc oxide and 600 parts by weight of expanded polystyrene particles having a diameter of 0.2 to 2.5 mm. and a bulk density of 20 g./l. are introduced into an intensive mixer. A loose mixture is prepared from these components. The ratio of the volume of anhydrous alkali metal silicates and inorganic filler in the mixture to the volume of the plastics particles is 1:10.

This mixture is introduced into a wooden mold consisting of lateral frame members and having a width of 53 cm. and a length of 103 cm. and slightly compacted therein so that after the lateral frame has been removed a loose but dimensionally stable shaped member is formed. The lateral framing has a height of 20 cm. This shaped member is stored for fourteen days at 20° C. and then for twenty-four hours at 30° C. at a pressure of 50 mm. Hg in a vacuum cabinet.

A shaped article is obtained which is very resistant to compression and has a unit weight of 160 kg./cu. m.

The shaped article may be divided by means of a vertical band saw into boards having a thickness of about 4 cm.

EXAMPLE 5

900 parts by weight of a closed-cell polyurethane hard expanded plastic which has been converted by size reduction into particles having a size of about 2 to 6 mm. and which has a bulk density of 30 g./l., 700 parts by weight of talc, 100 parts by weight of silica gel having a bulk density of about 600 g./l., 600 parts by weight of zinc oxide, 500 parts by weight of quartz powder, 750 parts by weight of water-glass powder having a water content of 20% by weight and a particle size of 0.2 to 0.5 mm., 100 parts by weight of 30% caustic potash solution, 1,750 parts by weight of sodium waterglass solution having a concentration of 39° Bé. and 200 parts by weight of a 25% cane sugar solution are introduced into an intensive mixer. The substances are mixed for two minutes so that a loose and easily pourable composition is obtained. The volume of substantially anhydrous alkali silicates and inorganic fillers in the mixture to the volume of plastics particles is 1:10.

This mixture is introduced into the wooden mold described in Example 4. After the mold has been removed, a loose but dimensionally stable shaped member remains which corresponds in its dimensions to those of the wooden mold. The shaped member is then stored for seven days at a temperature of 25° C. and then for twenty-four hours at a temperature of 35° C. in a vacuum cabinet at a pressure of 30 mm. Hg.

The pressure-resistant expanded plastics block is divided into boards by means of a band saw. The boards may be used as insulating material.

EXAMPLE 6

1,000 parts by weight of waterglass powder having a water content of 20% by weight and a particle size of 0.2 to 0.4 mm., 70 parts by weight of silica gel having a bulk density of 600 g./l., 300 parts by weight of zinc oxide, 1,000 parts by weight of talc, 300 parts by weight of quartz powder, 1,500 parts by weight of sodium waterglass solution having a concentration of 39° Bé., 300 parts by weight of a 30% caustic potash solution and 1,000 parts by weight of a predominantly closed-cell phenol resin expanded plastic which has been converted by mechanical size reduction into particles having a size of 2 to 6 mm. and which has a bulk density of 40 g./l. are introduced into an intensive mixer. A mixture is prepared from these ingredients. The ratio of the volume of anhydrous alkali metal silicate and the inorganic fillers to the volume of the plastics particles is 1:8.6.

This mixture is charged into the mold described in Example 4 and after the framing has been removed the remaining shaped article is stored at 20° C. in a closed chamber into which carbon dioxide is introduced and then dried for another twenty-four hours at a temperature of 39° C. and a pressure of 30 mm. Hg.

The block formed, which has a unit weight of 300 kg./cu. m., is parted into individual boards by sawing. The boards may be used as insulating material.

EXAMPLE 7

1,750 parts by weight of a sodium waterglass solution having a concentration of 39° Bé., 100 parts by weight of waterglass powder having a water content of 16% by weight and a particle size of 0.2 to 0.5 mm., 200 parts by weight of talc, 200 parts by weight of quartz powder, 100 parts by weight of sodium silicofluoride, 594 parts by weight of expanded polystyrene particles having a size of 0.2 to 2 mm. and a powder density of 18 g./l., 200 parts by weight of chloroparaffin having a content of 70% by weight of chlorine, 100 parts by weight of antimony trioxide and 100 parts by weight of a plastics dispersion having a solids content of 50% by weight (the solid consisting of a finely divided copolymer of 55% by weight of vinyl chloride and 45% by weight of butyl acrylate) are mixed together in an intensive mixer. The loose mixture is introduced into a perforated metal mold whose upper and lower portions are movable and which can be fixed by struts. The mixture is loosely filled into this mold and compacted by slight pressure to such an extent that a flat surface is formed. The mold has a height of 20 cm. The upper portion of the mold is then forced down in a press to such an extent that the height is lowered by 4 cm. The volume which the mixture has assumed prior to pressing in thus decreased by 20%. The mixture is left in this condition for twelve hours at a temperature of 70° C. so that a solid shaped member is formed. It has a unit weight of 120 g./l.

EXAMPLE 8

1,750 parts by weight of a sodium waterglass solution having a concentration of 39° Bé., 700 parts by weight of sodium waterglass powder having a water content of 16% and a particle size of 0.2 to 0.5 mm., 1,000 parts by weight of talc, 200 parts by weight of sodium silicofluoride, 300 parts by weight of a 50% aqueous dispersion of chlororubber, 75 parts by weight of antimony trioxide, and 960 parts by weight of expanded polystyrene particles having a size of 0.2 to 3 mm. and a bulk density of 24 g./l. are mixed together in an intensive mixer and the mixture is brought into a mold as described in Example 1. The volume of the mixture is decreased by 20% by compression and the mixture is left in this condition for eight hours at 75° C. The solidified mixture is then stored for twenty-four hours in a drying cabinet at 80° C. and a pressure of 30 torr. The finished article has a unit weight of 133 g./l. and may be parted into boards with horizontal or vertical band saws.

EXAMPLE 9

A wooden shuttering is placed in front of a pumice-brick wall at a distance of 10 cm. A mixture prepared in an intensive mixer from 2,000 parts by weight of a sodium waterglass solution having a concentration of 39° Bé., 500 parts by weight of waterglass powder having a water content of 16% by weight and a particle size of 0.2 to 0.5 mm., 400 parts by weight of talc, 400 parts by weight of sodium silicofluoride, 500 parts by weight of expanded polystyrene particles having a diameter of 0.2 to 2.5 mm. and a bulk density of 15 g./l., is introduced into the space between the shuttering and the wall. The mixture is slightly compressed mechanically and the surface made smooth so that the space is completely filled with a homogeneous loose composition. After twenty-four hours the shuttering is removed. An insulating layer is obtained which adheres firmly to the brickwork. This insulating layer, to which an additional coating, e.g., of plaster, may be applied, has a unit weight of 140 kg./cu. m.

We claim:
1. A process for the production of heat-insulating materials having an outstanding stability to permanent heat stress which comprises introducing closed cell porous polymer particles into an inorganic binder containing water and solidifying the resultant mixture, said binder being a suspension of alkali metal silicate particles and inorganic filler, said filler being a member from the group consisting of magnesium oxide, talc, calcium carbonate, silica gel, sodium silicofluoride, zinc oxide, asbestos powder, glass powder, quartz powder, zinc carbonate, and mixtures thereof, in aqueous solutions of alkali metal silicates having a concentration of 15 to 60° Bé., the ratio of the weight of the total anhydrous alkali metal silicate content of the mixture to the weight of the inorganic filler being from 1:1 to 4:1, the ratio of the volume of the total anhydrous alkali metal silicates and the inorganic fillers to the volume of said plastic particles being from 4:1 to 1:10, the total water content of the suspensions is from about 25% to 75% by weight with reference to the alkali metal silicate contained therein, and the mixture being solidified at temperatures above 20° C. and below the sintering temperature of the plastic particles, the porous polymer particles used being those which do not undergo any change in volume under the action of the temperatures chosen.

2. A process as claimed in claim 1 wherein the water content of the alkali metal silicate particles is from 16% to 20% by weight.

3. A process as claimed in claim 1 wherein the mixture prior to solidification is compressed to 10% to 75% of its original volume and the solidification is effected in the compressed condition.

4. A process as claimed in claim 1 wherein the solidification is assisted by removal of water, the removal of water being discontinued when the water content of the mixture has fallen below 20% by weight.

5. A process as claimed in claim 1, wherein the solidification is assisted by removal of water, the removal of water being discontinued when the water content of the mixture has reached a value of 5% to 15% by weight.

6. A process as claimed in claim 1 wherein the porous plastic particles consist of a member from the group consisting of polymers of styrene and its copolymers with acrylonitrile, acrylic acid and butadiene.

7. A product resulting from the process of claim 1.

8. A product resulting from the process of claim 1 in which said porous plastic particles are from the group consisting of polymers of styrene and its copolymers with acrylonitrile, acrylic acid and butadiene.

References Cited

UNITED STATES PATENTS

| | | |
|---|---|---|
| 2,797,201 | 6/1957 | Veatch et al. |
| 2,996,389 | 8/1961 | Fernhof. |
| 3,104,196 | 9/1963 | Shannon. |

FOREIGN PATENTS

| | | |
|---|---|---|
| 646,665 | 8/1962 | Canada. |

SAMUEL H. BLECH, *Primary Examiner.*

J. C. BLEUTGE, *Assistant Examiner.*

U.S. Cl. X.R.

106—75; 260—14, 17, 38, 41, 41.5, 45.7, 890